US006999614B1

(12) United States Patent
Bakker et al.

(10) Patent No.: US 6,999,614 B1
(45) Date of Patent: Feb. 14, 2006

(54) POWER ASSISTED AUTOMATIC SUPERVISED CLASSIFIER CREATION TOOL FOR SEMICONDUCTOR DEFECTS

(75) Inventors: David Bakker, Cupertino, CA (US); Saibal Banerjee, Fremont, CA (US); Ian R. Smith, Los Gatos, CA (US)

(73) Assignee: KLA-Tencor Corporation, San Jose, CA (US)

( * ) Notice: Subject to any disclaimer, the term of this patent is extended or adjusted under 35 U.S.C. 154(b) by 793 days.

(21) Appl. No.: 09/724,633

(22) Filed: Nov. 28, 2000

Related U.S. Application Data

(60) Provisional application No. 60/167,955, filed on Nov. 29, 1999.

(51) Int. Cl.
*G06K 9/62* (2006.01)
(52) U.S. Cl. .................... 382/159; 382/145; 382/224
(58) Field of Classification Search ........ 382/141–152, 382/155–161, 224
See application file for complete search history.

(56) References Cited

U.S. PATENT DOCUMENTS

| | | | | |
|---|---|---|---|---|
| 4,441,205 A | * | 4/1984 | Berkin et al. ................ | 382/151 |
| 5,093,867 A | * | 3/1992 | Hori et al. .................... | 382/141 |
| 5,121,439 A | * | 6/1992 | Fukuda et al. ............... | 382/141 |
| 5,226,118 A | | 7/1993 | Baker et al. ................. | 395/161 |
| 5,353,356 A | * | 10/1994 | Waugh et al. ............... | 382/143 |
| 5,526,437 A | * | 6/1996 | West ............................ | 382/141 |
| 5,537,670 A | * | 7/1996 | Cox et al. .................... | 382/219 |
| 5,544,256 A | * | 8/1996 | Brecher et al. .............. | 382/149 |
| 6,148,099 A | * | 11/2000 | Lee et al. .................... | 382/149 |
| 6,292,582 B1 | * | 9/2001 | Lin et al. ..................... | 382/149 |
| 6,480,627 B1 | * | 11/2002 | Mathias et al. .............. | 382/224 |
| 6,687,397 B1 | * | 2/2004 | DeYong et al. .............. | 382/145 |

FOREIGN PATENT DOCUMENTS

| | | |
|---|---|---|
| FR | 2 681 947 A | 4/1993 |
| WO | WO 99/22310 | 6/1999 |
| WO | WO 99/22311 | 6/1999 |
| WO | WO99/59200 | 11/1999 |
| WO | WO99/67626 | 12/1999 |
| WO | WO00/03234 | 1/2000 |

OTHER PUBLICATIONS

Otsu, N. "A Threshold Selection Method from Gray-Level Histograms" IEEE Trans. Systems, Man and Sybernetics, vol. SMC-9, 1979, pp. 62-66.

(Continued)

*Primary Examiner*—Bhavesh M. Mehta
*Assistant Examiner*—Aaron Carter
(74) *Attorney, Agent, or Firm*—Beyer Weaver & Thomas, LLP

(57) ABSTRACT

A method and system that optionally allows a user to view image defects organized by natural groupings based on features of the images. The natural groupings make it easier for the user to organize some or all of the images into classes in a training set of images. A feature vector is extracted from each image in the training set and stored, along with its user-specified class, for use by an automatic classifier software module. The automatic classifier uses the stored feature vectors and classes to automatically classify images not in the training set. If the automatically classified images do not match images manually classified by the user, the user modifies the training set until a better result is obtained from the automatic classifier. The system can provide feedback to an inspection system designed to aid in the setup and fine-tuning of the inspection system.

46 Claims, 14 Drawing Sheets

OTHER PUBLICATIONS

Kohonen, T. "The Self-Organizing Map" Proceedings IEEE, vol. 78, 1990, pp. 1464-1480.

Hosch, J. "In-Situ Sensors for Monitoring and Control of Process and Product Parameters" Sematech, Austin, TX 1996 American Institute of Physics.

Anderson, R., Soden, J., Henderson, C., "Failure Analysis: Status and Future Trends" Sandia National Laboratories, 1996 American Institute of Physics.

Nightflight.com web pages, "Simulated Annealing" [online] [retrieved on Oct. 28, 1999]. Retrieved from the Internet: <URL: http://www.nightflight.com>.

Extended Kohonen Maps web pages [online] [retrieved on Oct. 28, 1999]. Retrieved from the Internet: <URL: http://www.grid.let.rug.nl/-kleiweg/kohonen > 6 Pages.

Kamowski, Thomas P., Tobin, Kenneth W., Gleason, Shaun S., Fred Lakhani "The Application of Spatial Signature Analysis to Electrical Test Data Validation Study" Oak Ridge National Laboratory, Oak Ridge, TN 37831-6011, Sematech, Austin, TX 78741-6499,12 Pages.

Electroglas.com web pages, "Spatial Pattern Recognition" [online] [retrieved on Nov. 28, 2000]. Retrieved from the Internet: <URL: http://www.electroglas.com/products/knights_datasheets/spar_ds.htm > 4 Pages.

Dym.com web pages, "Spatial Signature Analysis (SSA)" [online] [retrieved on Nov. 28, 2000]. Retrieved from the Internet: <URL: http://www.dym.com/ssa.htm.> 2 Pages.

Oak Ridge National Laboratory web pages, "ORNL-SEMATECH Computing Tools Helps U.S. Semiconductor Industry Identify Manufacturing Problems" [online] [retrieved on Nov. 28, 2000]. Retrieved from the Internet: <URL: http://www.ornl.gov/Press_Releases/archive/mrl19980804-00.html> 2 Pages.

ISMV Semiconductor web pages, "Semiconductor Spatial Signature Analysis (SSA)", [online] [retrieved on Nov. 28, 2000]. Retrieved from the Internet: <URL: http://www.ismv.ic.ornl.gov/projects/SSA.html> 6 Pages.

International Search Report, dated Jan. 14, 2002, 3 pages.

* cited by examiner

Smart Gallery window

Fig. 4(a)

Confusion Matrix — User-Trained Groups — Manual

X - Axis: Manual
Y - Axis: User-Trained Group

| Current | Total | □ 9 | □ 101 | □ 102 | □ 103 | □ 105 | □ N/A |
|---|---|---|---|---|---|---|---|
| Total | 10 | 3 | 2 | 2 | 2 | 1 | |
| 9 | 3 | 3 | 0 | 0 | 0 | 0 | |
| 101 | 2 | 0 | 2 | 0 | 0 | 0 | |
| 102 | 2 | 0 | 0 | 2 | 0 | 0 | |
| 103 | 2 | 0 | 0 | 0 | 2 | 0 | |
| 105 | 1 | 0 | 0 | 0 | 0 | 1 | |
| N/A | 0 | 0 | 0 | 0 | 0 | 0 | 0 |
| Total | 10 | | | | | | |
| Accuracy % | 100.00 | 100.00 | 100.00 | 100.00 | 100.00 | 100.00 | |
| Purity % | 100.00 | 100.00 | 100.00 | 100.00 | 100.00 | 100.00 | |
| Known Errors | | 3 | 2 | 2 | 2 | 1 | 0 |

Confusion Matrix (Defects in Agreement)

Confusion Matrix — User-Trained Groups — Manual

X - Axis: Manual
Y - Axis: User-Trained Group

| Current | Total | □ 9 | □ 101 | □ 102 | □ 103 | □ 105 | ☑ N/A |
|---|---|---|---|---|---|---|---|
| Total | 10 | 3 | 2 | 2 | 2 | 1 | |
| 9 | 3 | 3 | 0 | 0 | 0 | 0 | |
| 101 | 2 | 0 | 2 | 0 | 1 | 0 | |
| 102 | 2 | 0 | 0 | 2 | 0 | 0 | |
| 103 | 2 | 0 | 0 | 0 | 2 | 0 | |
| 105 | 1 | 0 | 0 | 0 | 0 | 1 | |
| N/A | 0 | 0 | 0 | 0 | 0 | 0 | 0 |
| Total | 10 | | | | | | |
| Accuracy % | 100.00 | 100.00 | 100.00 | 100.00 | 100.00 | 100.00 | |
| Purity % | 100.00 | 100.00 | 100.00 | 100.00 | 100.00 | 100.00 | |
| Known Errors | | 0 | 0 | 0 | 0 | 0 | 0 |

Confusion Matrix (Known Errors)

Fig. 4(b)

POWER ASSISTED AUTOMATIC SUPERVISED CLASSIFIER CREATION TOOL FOR SEMICONDUCTOR DEFECTS

RELATED APPLICATIONS

This application claims priority under 35 U.S.C. § 119(e) to U.S. Provisional Application Ser. No. 60/167,955 entitled "power Assisted Automatic Supervised Classifier Creation Tool for Semiconductor Defects," of Bakker, Banerjee, and Smith et al., filed Nov. 29, 1999.

The following applications are related to this application and are herein incorporated by reference:
1. U.S. application Ser. No. 08/958,288 of Hardikar et al., filed Oct. 27, 1997.
2. U.S. application Ser. No. 08/958,780 of Hardikar et al., filed Oct. 27, 1997.

The following U.S. patent is related to this application and is herein incorporated by reference:
1. U.S. Pat. No. 5,226,118 to Baker et al., issued Jul. 6, 1993.

BACKGROUND OF THE INVENTION

1. Field of the Invention

The present invention relates generally to software programs and, more generally, to software-controlled optical, ebeam, or other types of inspection systems for semiconductor wafers.

2. Description of Background Art

As new materials, methods, and processes are introduced into semiconductor manufacturing, new defects are emerging in the manufacturing process that can greatly impact yield. These changes require chipmakers to adopt new technologies to detect and classify these yield-limiting defects more quickly, accurately and consistently in order to tighten their manufacturing processes and accelerate their yield-learning curve. At the same time, shrinking product lifecycles and accelerated time-to-market requirements are forcing fabrication plants to speed their product ramp ups for new products to meet their profitability objectives. This, in turn, is driving the need for faster automatic defect classification (ADC) setup to ensure fabrication plants can reap the benefits of ADC without slowing the ramp process.

Currently existing optical inspection systems with automatic defect classification require human beings to visually inspect semiconductor wafers for suspected defects and to classify the types and causes of the defects in order to set up the automatic classification system. To perform this classification, a human being must sort through hundreds of images that are presented in random order. This process takes many hours and increases the cost of production. Moreover, even skilled human operators are somewhat slow and prone to error.

SUMMARY OF THE INVENTION

The described embodiments of the present invention receive images of defects and aid a user in classifying the types of defects represented. A graphical user interface allows a human user to manually classify the defect images via Automatic Supervised Classifier software and further allows the user to contrast his manual classifications with the classifications determined by Automatic Supervised Classifier software. In order to create an Automatic Supervised Classifier for semiconductor defect classification, the human user has to perform two manual tasks:

(i) Creation of a good Classification Scheme (which images the user will place into which classes).

(ii) Creation of a good training set of examples for the Automatic Supervised Classifier with this Classification Scheme.

The described embodiments of the invention provide a tool to help the human user achieve both these objectives in record time.

The embodiments described herein contain four main components that seamlessly interact with one another:

(i) Image Gallery: This is a graphical interface to display a list of images in an organized fashion.

(ii) Dynamic Automatic Supervised Classifier: Given a list of defects, the user is allowed to manually classify or train any set of defects. The rest of the defects are dynamically classified accordingly and the overall performance of the resulting classifier is calculated.

(iii) Dynamic Classifier Controls and Performance Tools: This allows the user to visualize and optimize the parameters of the classifier even further. As in (ii), the resulting performance is immediately visible.

(iv) Unsupervised Automatic Classifier (Natural Grouping): This groups the images in a way that allows the user to visualize the layout and structure of the feature space in terms of defect images, and assists the user in creating both a good classification scheme and a good training set of examples.

BRIEF DESCRIPTION OF THE DRAWINGS

FIG. 4(a) shows an example of a confusion matrix in the user interface where the manual and automatic classification are in agreement.

FIG. 4(b) shows an example of the confusion matrix in the user interface where the manual and automatic classification are not in agreement.

DETAILED DESCRIPTION OF PREFERRED EMBODIMENTS

The described embodiments of the present invention aid a user in classifying defect images input to the system from an outside source. For example, the images can be received from a scanning electron microscope (SEM), a defect inspection system, such as KLA-Tencor's 2132 inspection tool, or any similar instrument used to generate images and detect errors therein. In certain embodiments, the images can come from more than one type of input source. For example, images may be received from both an SEM and a 2132 inspection tool. Different types of images received from different sources can aid in defect classification, since different types of images produce more information is provided concerning the defects to be classified. The images also can be point locations on wafers.

Figure 1B:
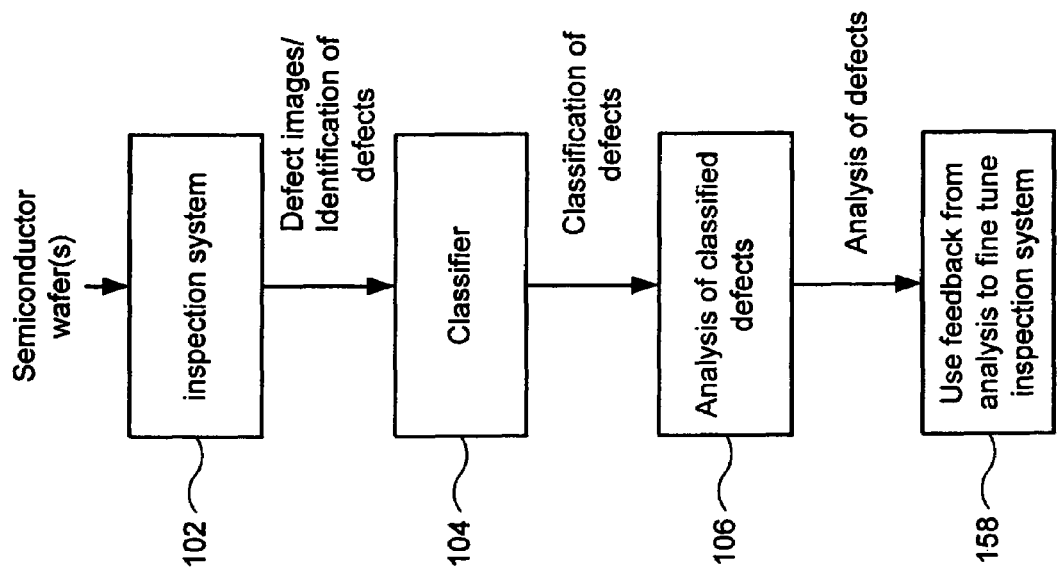
FIG. 1(b) is a block diagram showing an overview of a semiconductor optical, ebeam, or other types of inspection systems using the present invention for inspection set-up.
Figure 1A:
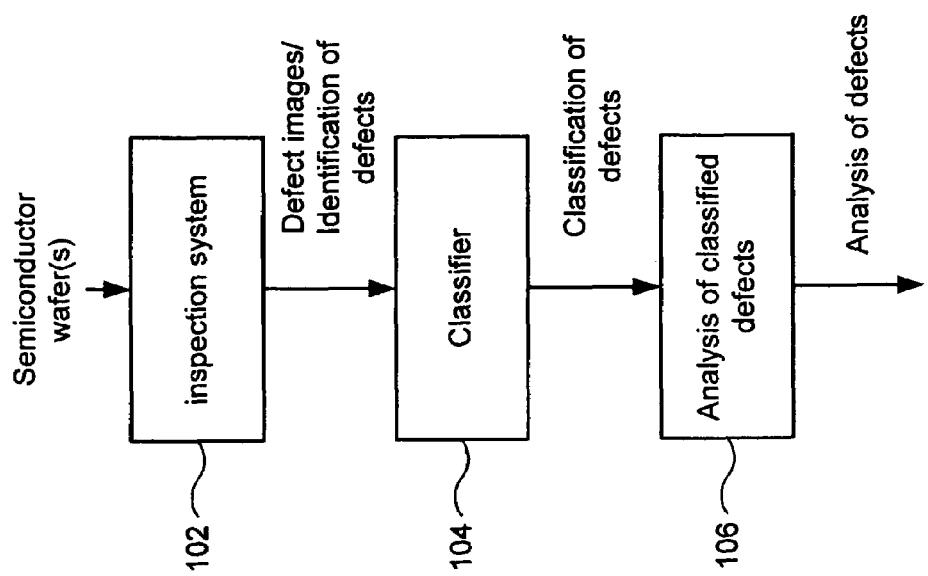
FIG. 1(a) is a block diagram showing an overview of a semiconductor optical, ebeam, or other types of inspection systems.

FIG. 1(a) is a block diagram showing an overview of a semiconductor optical, ebeam, or other types of inspection systems. As discussed above, defect images are preferably received from an outside source, such as an optical, ebeam, or other types of inspection systems 102, an SEM or a 2132 inspection tool. The defect images tell a classification system 104 that defects have occurred, but does not classify the defects as to types or causes. After the defects are classified, as described below, they are sent to an analyzer 106, such as KLA-Tencor's KLArity system, an example of which is described in the above-referenced U.S. application Ser. Nos. 08/958,288 and 08/958,780.

FIG. 1(b) is a block diagram showing an overview of a semiconductor optical, ebeam, or other types of inspection systems using the present invention for inspection set-up. As discussed above, defect images are preferably received from an outside source, such as an optical, ebeam, or other types of inspection systems 102, an SEM or a 2132 inspection tool. These images can relate to etch, photolithography, deposition, CMP, or to some other manufacturing process. The defect images tell a classification system 104 that defects have occurred, but does not classify the defects as to types or causes. After the defects are classified, as described below, they are sent to an analyzer 106, such as KLA-Tencor's KLArity system, an example of which is described in the above-referenced U.S. application Ser. Nos. 08/958, 288 and 08/958,780. The output of the analyzer 106 is used as feedback to fine tune the inspection system.

For example, depending on the number of errors found and the accuracy desired, the inspection system may be fine tuned to raise or lower the sensitivity of the system. For example, if the system is finding too many errors or errors that are not relevant to the particular manufacturing process, the system may be fine tuned to lower its sensitivity, resulting in fewer errors detected. As another example, if not enough errors are being detected or if errors of a certain type are not being detected, the inspection system may be adjusted to become more sensitive, so as to detect data that will result in the detection of more errors or of errors of a desired type. In certain embodiments, it has been observed that as sensitivity is increased, error detection increases exponentially. In such a system, feedback to the ADC can be used to control inspection parameters including but not limited to: illumination, sensitivity or sensing (optical, ebeam, etc), threshold of detection, filtering, and/or polarization.

In another embodiment, the feedback is used to control the manufacturing process. For example, feedback from the analysis portion could be used to shutdown the process or a certain machine if too many errors are detected from that machine. Similarly, the feedback could be used to re-route lots to machines or processes with the lowest errors rates on either a static or a dynamic basis.

In another embodiment, the inspection and analysis/classification process is performed in real-time during the inspection process instead of as a separate process. (An example of this is shown in the system of FIG. 10(c)). In such a system, inspection system 1052 is shown inside the system 1004 to indicate that it is part of the same system as the classifier 1056.

Figure 2:
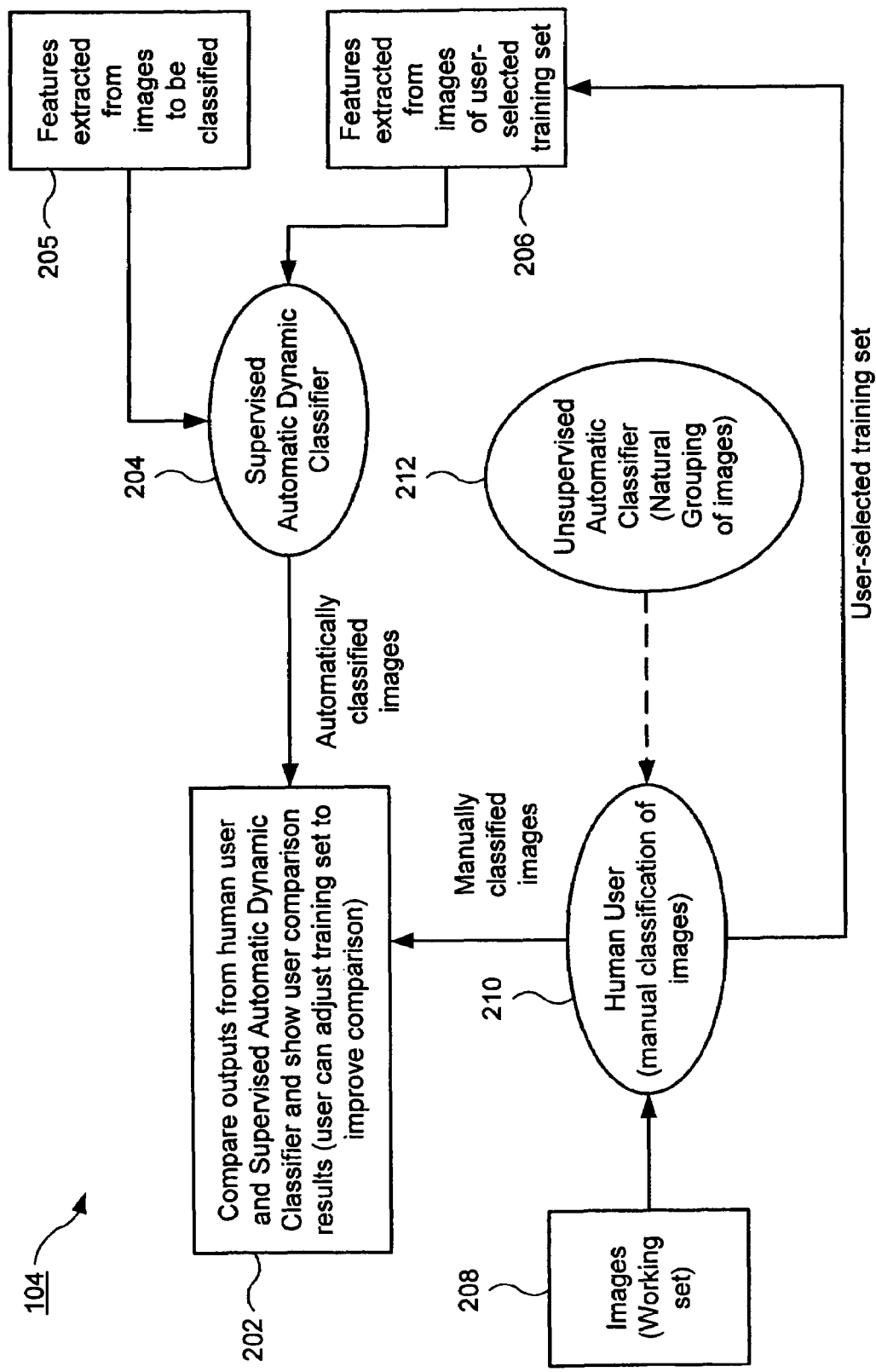
FIG. 2 is a block diagram showing the interaction of a human user with sections of an embodiment of defect classifier software.

FIG. 2 is a block diagram showing the interaction of a human user with an embodiment of defect classifier software. A working set 208 of images, such a wafer defect images, is displayed for user review (as discussed below in connection with FIG. 3). A human user 210 can review the defect images in the working set.

The human user can also request that the images be organized by natural grouping 212 and displayed according to this organization. The human can manually classify the defect images into classes (also called "bins") according to the human's understanding of the type of defect represented by the image. Currently, the extracted features of the defect images are used to naturally group the defect images, using a Kohonen mapping technique. Kohonen mapping is described, for example in T. Kohonen, "The Self-Organizing Map," Proceedings of the IEEE, Vol. 78, 1990, pp. 1464–1480, which is herein incorporated by reference. Other methods can be used for natural grouping, such as K-means; the method described in N. Otsu, "A Threshold Selectron Method from Gray-Level Histrograms," IEEE Trans. Systems, Man, and Cybernetics, Vol. SMC-9, 1979, pp. 62–66 (which is herein incorporated by reference); or any other appropriate technique or method that groups defect images according to common features. In a described embodiment, both the natural grouping 212 and the automatic classifier 204 use the same feature set.

In addition, the human user can select images from the working set to be placed in a "training set" of images. The user then manually adds images/defects to the class/bins of the training set. Features are extracted from the selected images and stored along with the class/bin during a "train classifier" operation. The classifier then classifies a set of images (such as the set W-T) and the user reviews the errors found in the classifier's decisions. For example, the user may view the confusion matrix to determine where the classifier differed form the user's classifications. The user then improves the training set by adding deleting, or reclassifying images via, e.g., a drag and drop interface and reassesses the classifier's performance until a satisfactory result is achieved.

The images in the training set are sent to feature extractor software 206, which extracts a set of predefined features for each image in the training set. The data structures storing a set of features for an image is called the image's "feature vector." A feature vector contains the values for each feature for a particular image.

The predefined features preferably extracted from the training set include, but are not limited to:

a) features extracted from an image, such as: size, brightness, color, shape, texture, moment of inertia, context, proximity to wafer features or other defects, connectivity to adjacent features or other defects, other yield relevant properties derived from the image (e.g. short, open, bridging, particles, scratches, etc.)

b) defect coordinates in wafers and spatial clusters of defect coordinates in the case of spatial cluster analysis, and c) other information pertaining to the defect that may be have been developed a priori, including but not limited to image type information such as in list a) and b), compositional or electrical information derived from analytic techniques and information pertaining to the processing history, yield relevance or origins of the defects in question. It will be understood that any appropriate features can be extracted without departing from the spirit of the present invention. Examples of analytical techniques used to derive compositional or electrical information are described in "Semiconductor Characterization: Present Status & Future Needs" ed. W. M. Bullis, D. G. Seiler, A. C. Diebold, American Institute of Physics 1996, ISBN 1-56396-503-8 which contains an overview of the myriad ways of analyzing defects and their yield relevance and which is herein incorporated by reference.

Supervised Automatic Dynamic Classifier software 204 uses the extracted features of the images in the training set to classify the images in the working set (W) that were not selected by the user as part of the training set (T) (i.e., to classify the set of images W-T). In a preferred embodiment of the invention, the classifier 204 uses a nearest neighbor method in which the features are extracted from the image set W-T and each image in W-T is classified as belonging to a class. In general, an image in W-T belongs to the class whose members have feature vectors most closely resembling the feature vector of the image. It should be understood that other automatic classification methods could be used. For example, the features in the feature vectors could be weighted (either by the user or using a predefined weighting).

Once the images in the set W-T is classified by classifier 204, the results of the automatic classification are compared with the results of the user's manual classification. If the user has classified any images that are also classified by classifier 204, the results are compared and the comparison displayed in a visual form to the user. The user may, at this point, alter his classification scheme and make alterations to the training set of images accordingly. The user may also change his manual classification if he decides that the automatic classification looks more correct.

Figure 3:
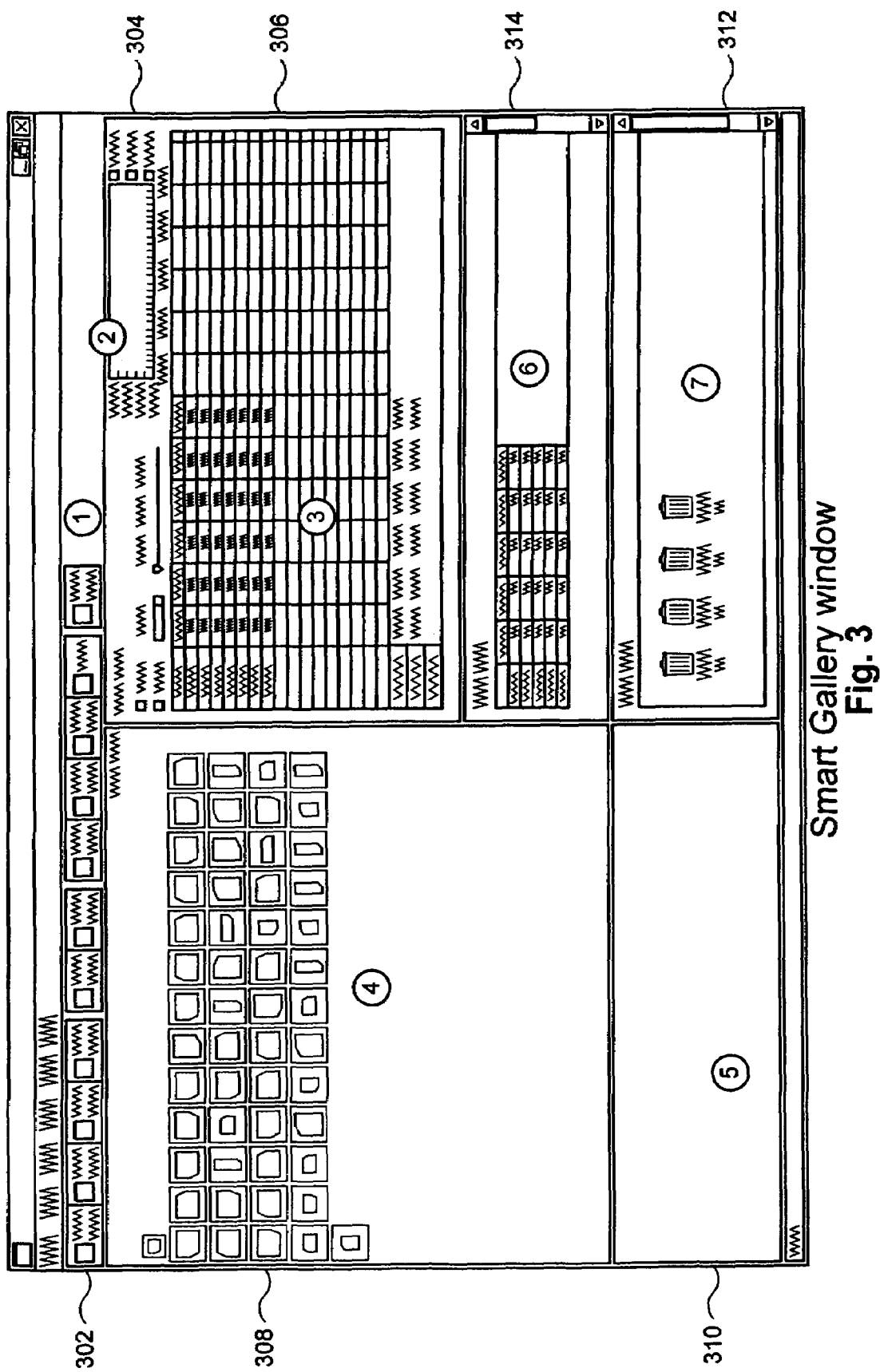
FIG. 3 shows an interface generated by defect classifier software in accordance with a preferred embodiment of the present invention.

FIG. 3 shows an interface generated by defect classifier software in accordance with a preferred embodiment of the present invention. Specifically, FIG. 3 shows an example of a "Smart Gallery" window in accordance with a preferred embodiment of the invention. One of the main purposes behind the Smart Gallery window is to provide a gallery-based classification capability. The Smart Gallery allows the user to view thumbnail images of the defects at adjustable sizes and resolutions, presenting a group of defects in an organized fashion. It also assists the user in the classification scheme creation by providing defects in groups based on appearance.

The benefits of the Smart Gallery system include:
Defect sorting
Allowing the human user to perform quicker and more efficient classification and organization of his manual sorting schemes
Faster manual sorting scheme creation
Shorter manual classification time
Better manual classification quality (repeatability)
Quicker, more effective classifier creation process The window of FIG. 3 includes a tool bar 302, which contains commands that allow the user to open and save classes and defect images, to sort images in the working set, and to create and manipulate the training set. A confidence setting area 304 allows the user to adjust the Confidence level, which is an adjustable setting of how close an unknown defect can be to a training set. Values preferably range from 0 (loosest setting) to 1 (tightest setting). Changes can be dynamically viewed in confusion matrix 306.

Confusion matrix 306 is used to display the results of manual vs. automatic defect classification. A confusion matrix can be generated for both a current set of images or an explicitly selected set. The manual (human) classification results are displayed on the X-axis and the automatic classification by classifier 204 are displayed on the y-axis. Results of the comparison that are in agreement for all defect classes (where both manual and automatic classification results are in agreement) are displayed on the diagonal across the confusion matrix.

An area 308 displays the working set of images. These images may be displayed in unsorted order or may be sorted or arranged by natural grouping, at the choice of the user. The user preferably drags and drops images from the working set gallery 308 into the training set gallery 310. Here, images in the training set are displayed arranged in user-specified classes. Training set area 312 displays the classes (also called "bins") that contain the composition of the training set, defines grouping, and allows the user to create new classes/bins. When this area 312 is active, the user can create new classes/bins using the toolbar 302.

Natural grouping matrix 314 allows the user to view how the images in the working group are distributed in the natural groupings. The number of images in a group is represented by a number in an element of the matrix 314. The user can click on an element in the matrix 314 to view all defect images in a particular natural grouping.

In summary, the user can optionally indicate (e.g., via the toolbar or a menu item) that he wants the working set images sorted in natural groupings. The user then drags and drops the images from area 308 into the classes/bins of the training set 310/312 and indicates a "training" function. The training function stores the feature vectors of the user-selected images of the training set and stores them in connection with the classes/bins. Once the training set is indicated, the automatic classifier classifies the remaining images. The classifier 204 can also use the training set to classify some other set of images. In different embodiments, classifier 204 can either run in the background, reclassifying images whenever the training set is changed, or it can be run explicitly by the user. The result of the classifier 204 is compared to any manual classification done by the user and the comparison results are displayed on the confusion matrix. The user can then add or subtract images to or from the training set via 310 of FIG. 3 in accordance with the contents of the confusion matrix.

The images can be automatically grouped according to invariant core classes, such as those shown in PCT Publication No. WO 00/03234 (inventor: Ben-Porath et al.), published Jan. 20, 2000, which is herein incorporated by reference. The results of the ADC process could also be incorporated in an overall fab yield management system, such as that shown in PCT Publication No. WO 99/59200 (inventor: Lamey et al.), published Nov. 18, 1999, which is herein incorporated by reference. This application also incorporates by reference PCT Publication No. WO 99/67626 (inventor: Ravid) published Dec. 29, 1999.

FIG. 4(a) shows an example of confusion matrix 306 where the manual and automatic classification are in agreement (see diagonal elements 402). In the example, one image is agreed to be in class "3", three images are agreed to be in class "2" and one image is agreed to be in class "1". Clicking on a "Correct" button next to the matrix will cause results in agreement to be highlighted. Clicking on a "known errors" button will cause results not in agreement to be highlighted. Clicking on the "image" button allows the user to view the images that were used to generate a particular element in the matrix.

FIG. 4(b) shows an example of the confusion matrix 306 where the manual and automatic classification are not in agreement. Element 452 is a non-zero element off the diagonal of the matrix.

Figure 5A:
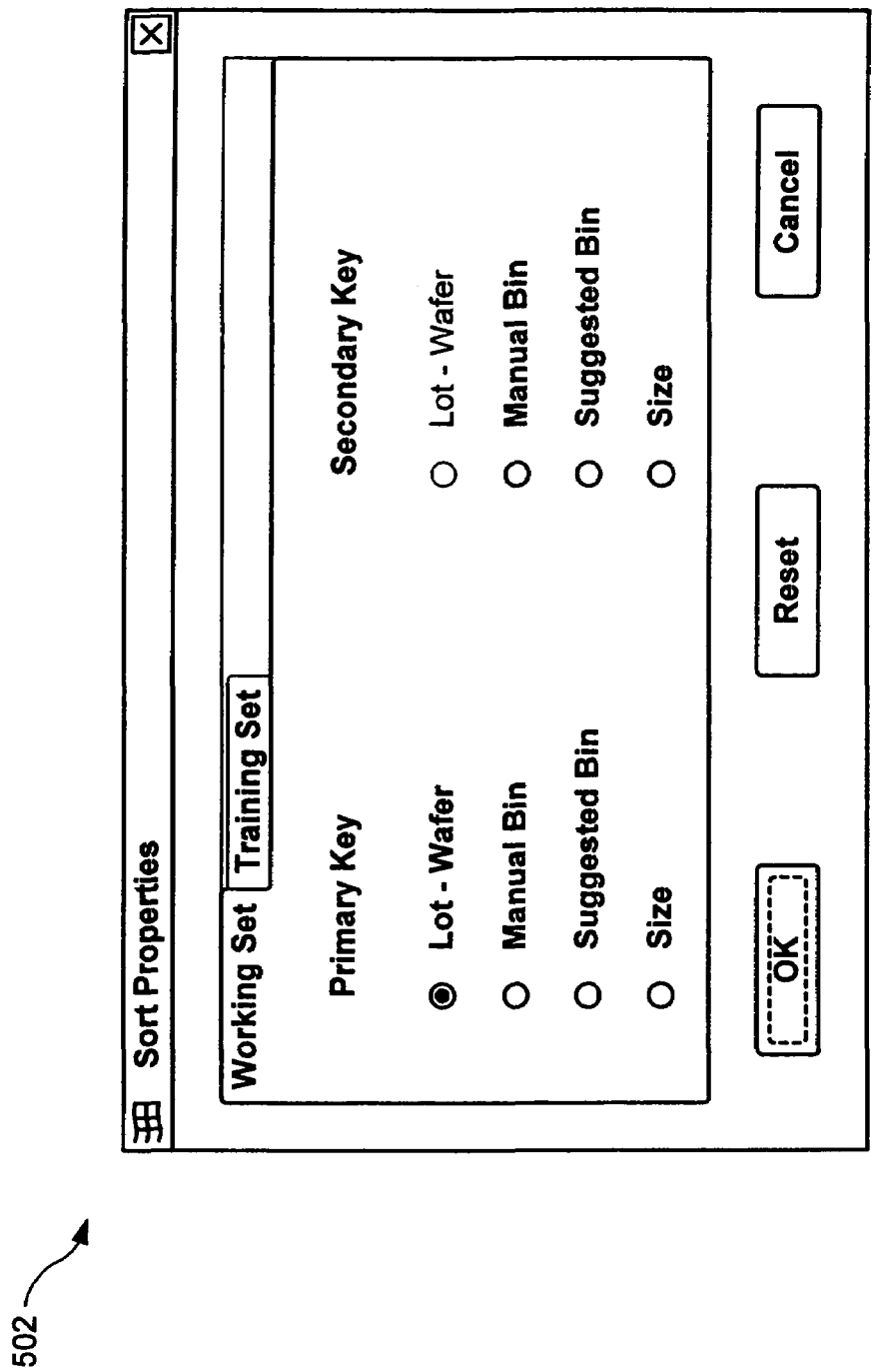
FIGS. 5(a) and 5(b) shows examples of an interface that allows the user to display in sorted order the images in the working set and in the training set.
Figure 5B:
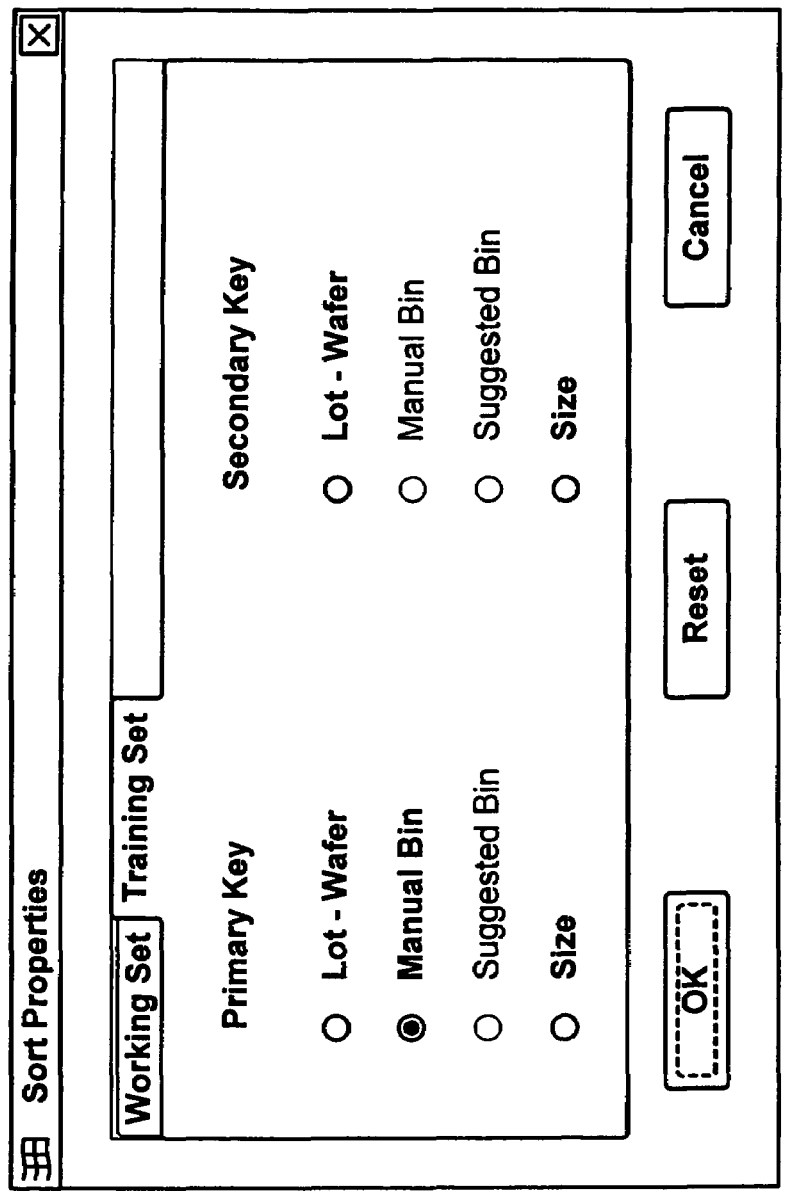

FIGS. 5(a) and 5(b) shows respective examples of an interface 502, 552 that allows the user to display in sorted order the images in the working set and in the training set. The images are preferably sorted by such factors as lot number, manual bin, suggested bin, and size.

Figure 6A:
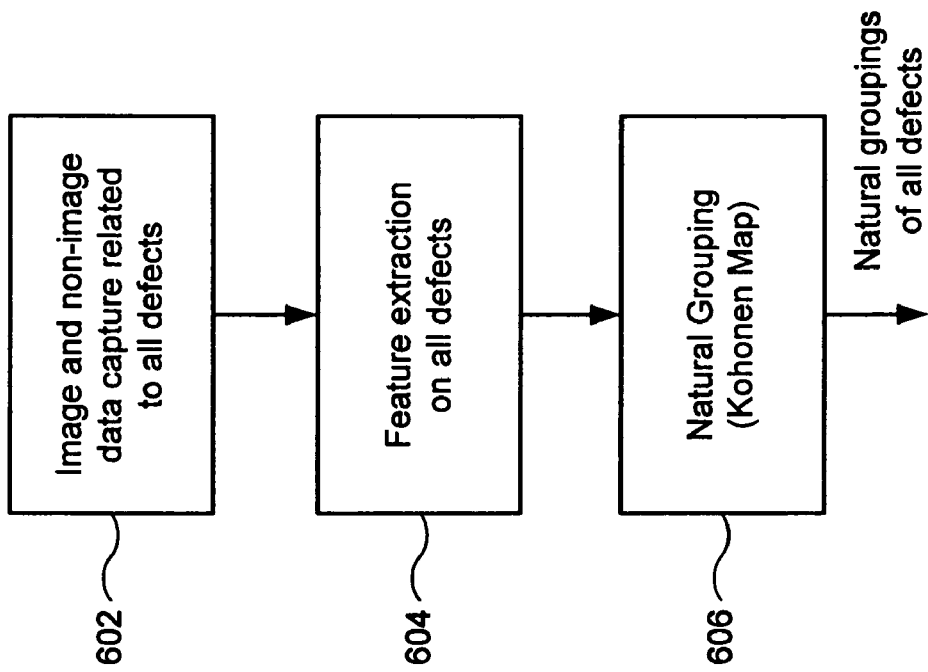
FIG. 6(a) is a flow chart showing a method for natural grouping of images in the working set.
Figure 6B:
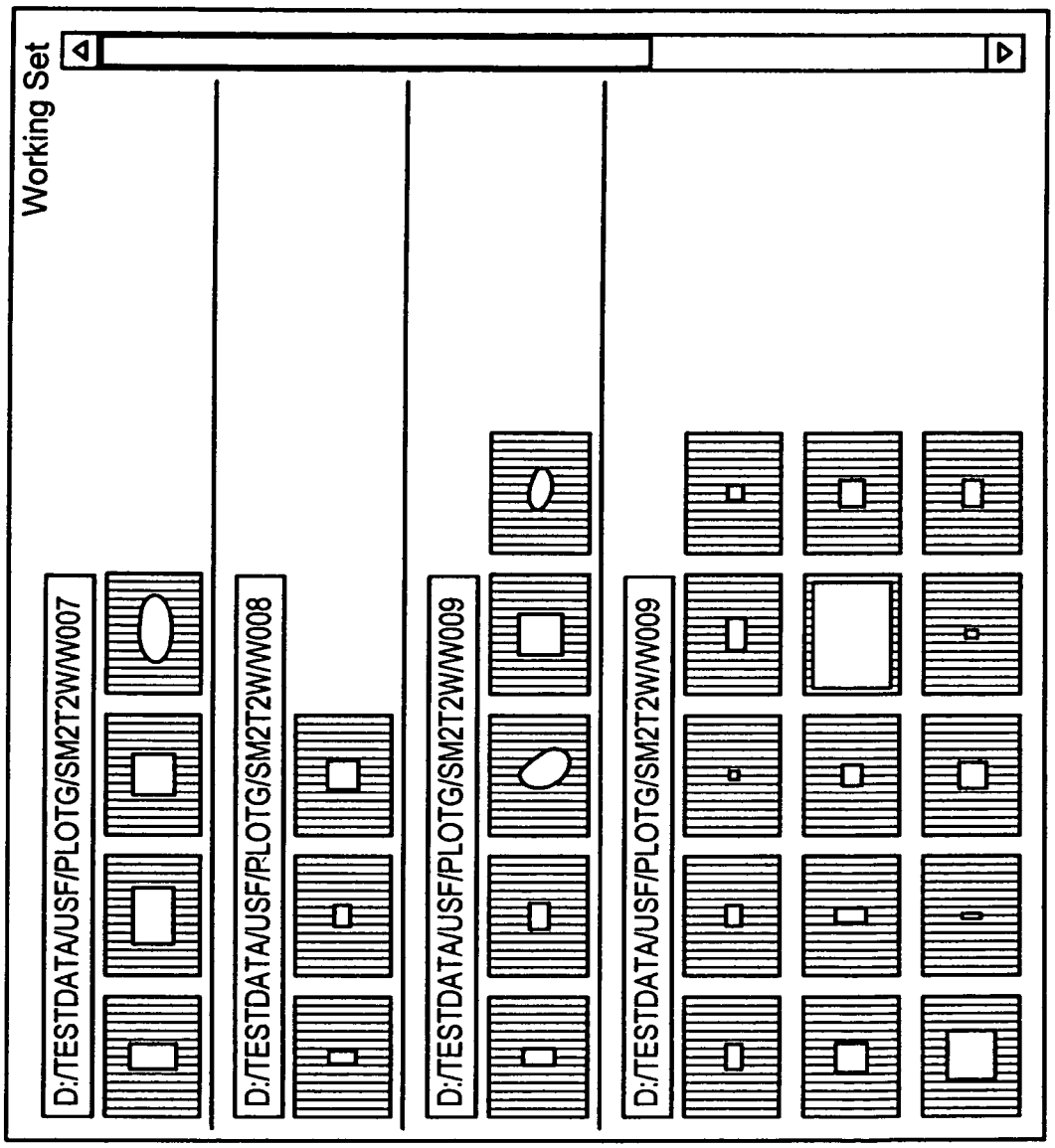
FIG. 6(b) shows images organized and displayed in their natural groups.

FIG. 6(a) is a flow chart showing a method for natural grouping of images in the working set 308. In element 602, images are captured for defect images. Features are extracted from the images in element 604. The extracted features are input to a natural grouping method 606, which can be any appropriate method. In the described embodiment, the feature vectors of the images are grouped using a known Kohonen mapping technique. In the described embodiment, the Kohonen map is seeded with non-random numbers to improve stability of the grouping and to make the grouping repeatable. In some embodiments, the images are displayed in their natural groups (also called clusters), as shown in FIG. 6(b). In other embodiments, the images are arranged to reflect the actual Kohonnen maps layout.

Certain embodiments use a Spatial Signature Analysis (SSA) Technique, as described in 1) http://www-ismv.i-c.ornl.gov/projects/SSA.html; 2) Gleason S. S., Tobin K. W., & Karnowski, T. P., "Spatial Signature Analysis of Semiconductor Defects for Manufacturing Problem Diagnosis", Solid State Technology, July, 1996; 3) http://www.dym.com/ssa.htm; 4) http://www.electroglas.com/products/knights-_datasheets/spar_ds.htm; and 5) http://www.ornl.gov/Press-_Releases/archive/mr19980804-00.html, which are herein incorporated by reference.

In addition, in certain embodiments, the analysis and classification are not limited to images, but can be performed on clusters themselves. In such an embodiment, the classifier receives "cluster-based features" instead of raw images as described in T. P. Karnowski, K. W. Tobin, S. S. Gleason, Fred Lakhani, SPIE's 24th Annual International Symposium on Metrology, Inspection and Process Control for Microlithography XIII, Santa Clara Convention Center, Santa Clara, Calif., February, 1999, which is herein incorporated by reference. Such a system applies grouping and Kohonen mapping to clusters instead of to raw images. For non-image data, clustering is gathered by EDS specifiers (using an x-ray system for analysis in an e-beam system) or by SSA analysis.

Figure 7:
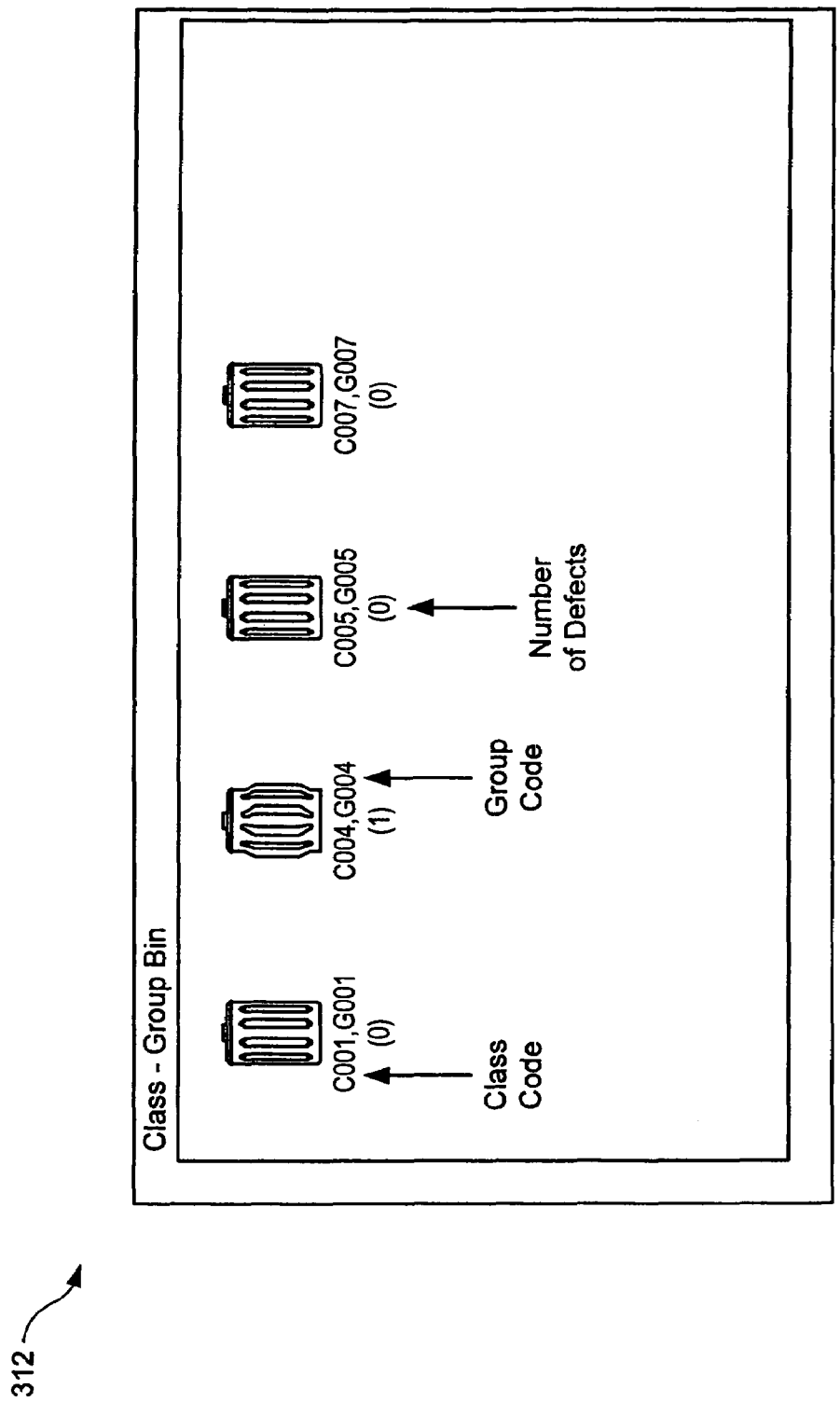
FIG. 7 shows an expanded view of a training area in the user interface.

FIG. 7 shows an expanded view of training area 312. The user can drag images from the working group 308 into the displayed groups in area 310 or into the classes/bins of area 312. In the displayed embodiment, each class/bin has a class code, a group code (reflecting its natural group) and a number of defect images currently assigned to the class/group. The user can, of course, add and delete classes/bins as he wishes (e.g., via the toolbar).

If the user wants to add a new class/bin, the class/bin is added. Other wise, an existing class/bin is opened. The user then manually adds images/defects to the class. Features are extracted from the selected images and stored during a "train classifier" operation (e.g., via the toolbar). The classifier then classifies a set of images (such as the set W-T) and the user reviews the errors found in the classifier's decisions.

For example, the user may view the confusion matrix to determine where the classifier differed form the user's classification. The user than improves the training set by adding deleting, or reclassifying images via, e.g., a drag and drop interface and reassesses the classifier's performance until a satisfactory result is achieved.

Figure 8:
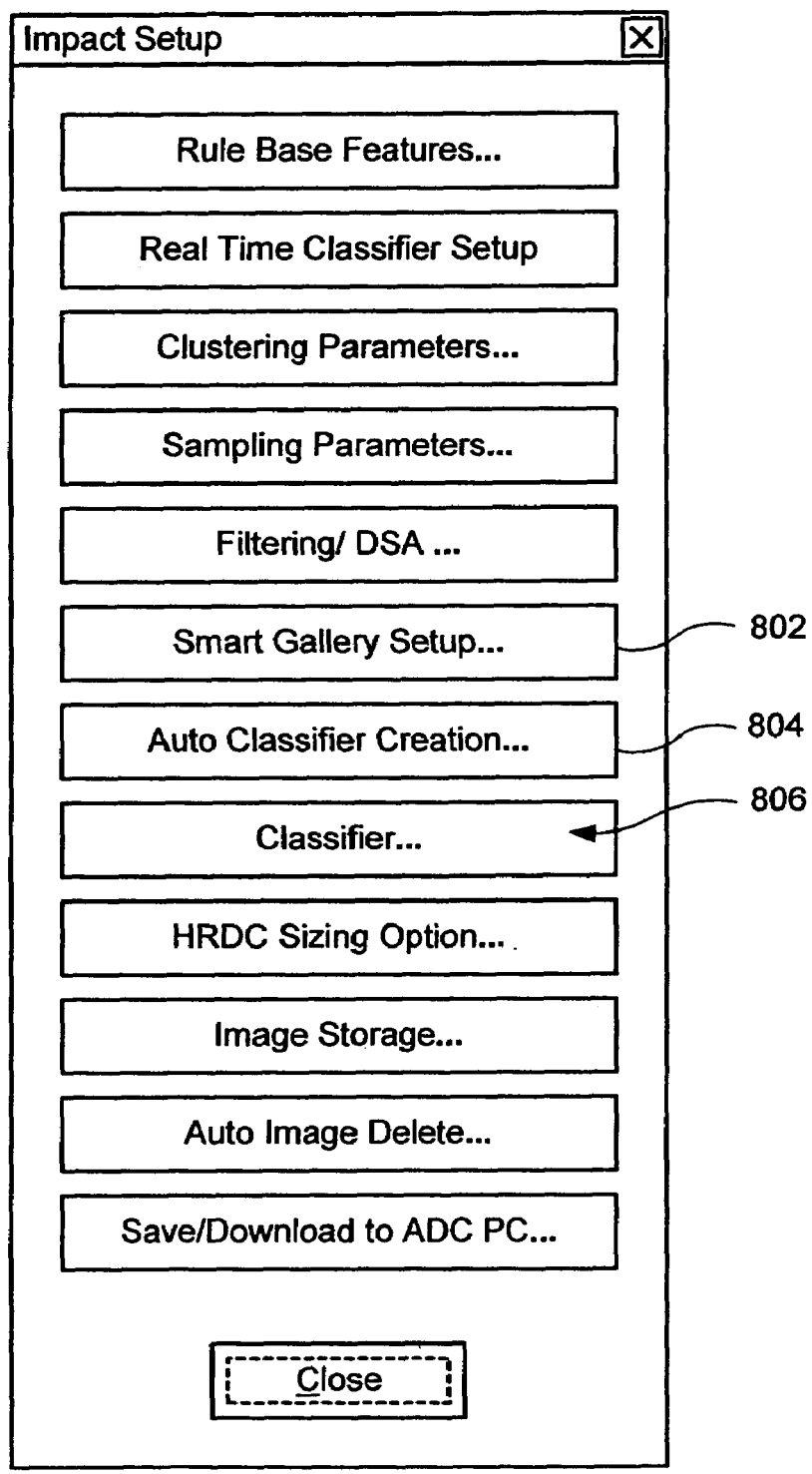
FIG. 8 shows an example user interface used in a preferred embodiment of the present invention.

FIG. 8 shows an example user interface that includes a "Smart Gallery" setup function 802, an Auto Classifier Creation function 804, and a Classifier function 806. The Smart Gallery setup function leads to the user interface of FIG. 3. The classifier function leads to the user interface of FIG. 9. "Smart Gallery is a trademark of KLA-Tencor Corporation.

Figure 9:
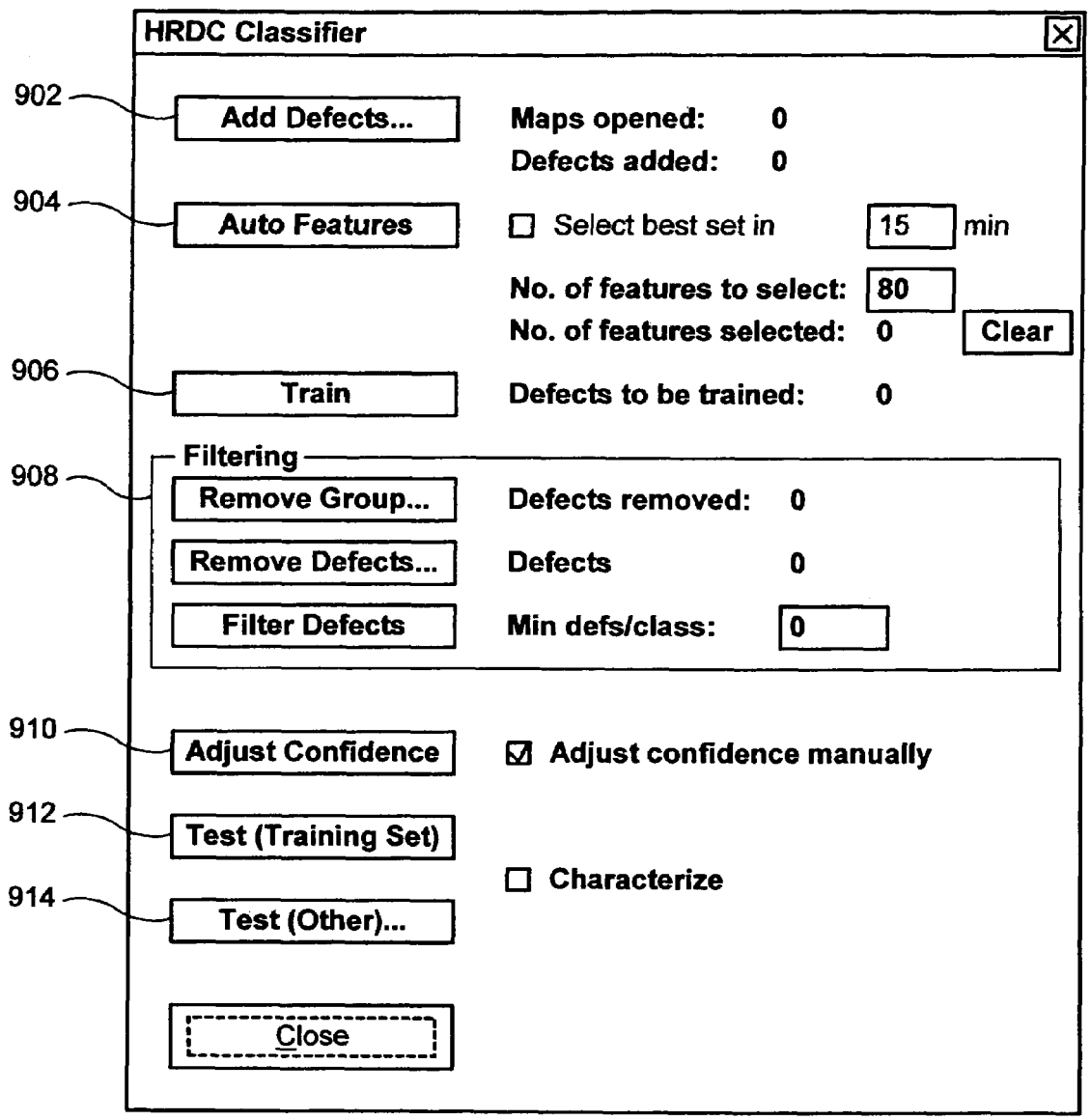
FIG. 9 shows an additional user interface for the Classifier Function.

FIG. 9 shows an additional user interface for an embodiment of the Automatic Classifier Function. This embodiment is an alternative to the toolbar-driven, drag and drop method. Using this interface, a user can add defect images to the training set 902 and specify the features to extract for natural grouping and for the feature extractor of the classifier 904. The user can specify the number of features to extract (here, 80). When the user selects a Train button 906, the features of the images in the training set are extracted and saved as feature vectors for each image. The class/bin of each image is saved in association with the feature vector.

The user can set filters 908 on the images, removing certain groups, images, and types of images from the features extraction process. The user can also adjust the confidence of the feature method methods used by the classifier 204 using button 910.

When the user clicks Test (Training set) button 912, the classifier 204 classifies the set of images W-T into the bins in the training set in accordance with the feature vectors of the images in the training set.

Figure 10A:
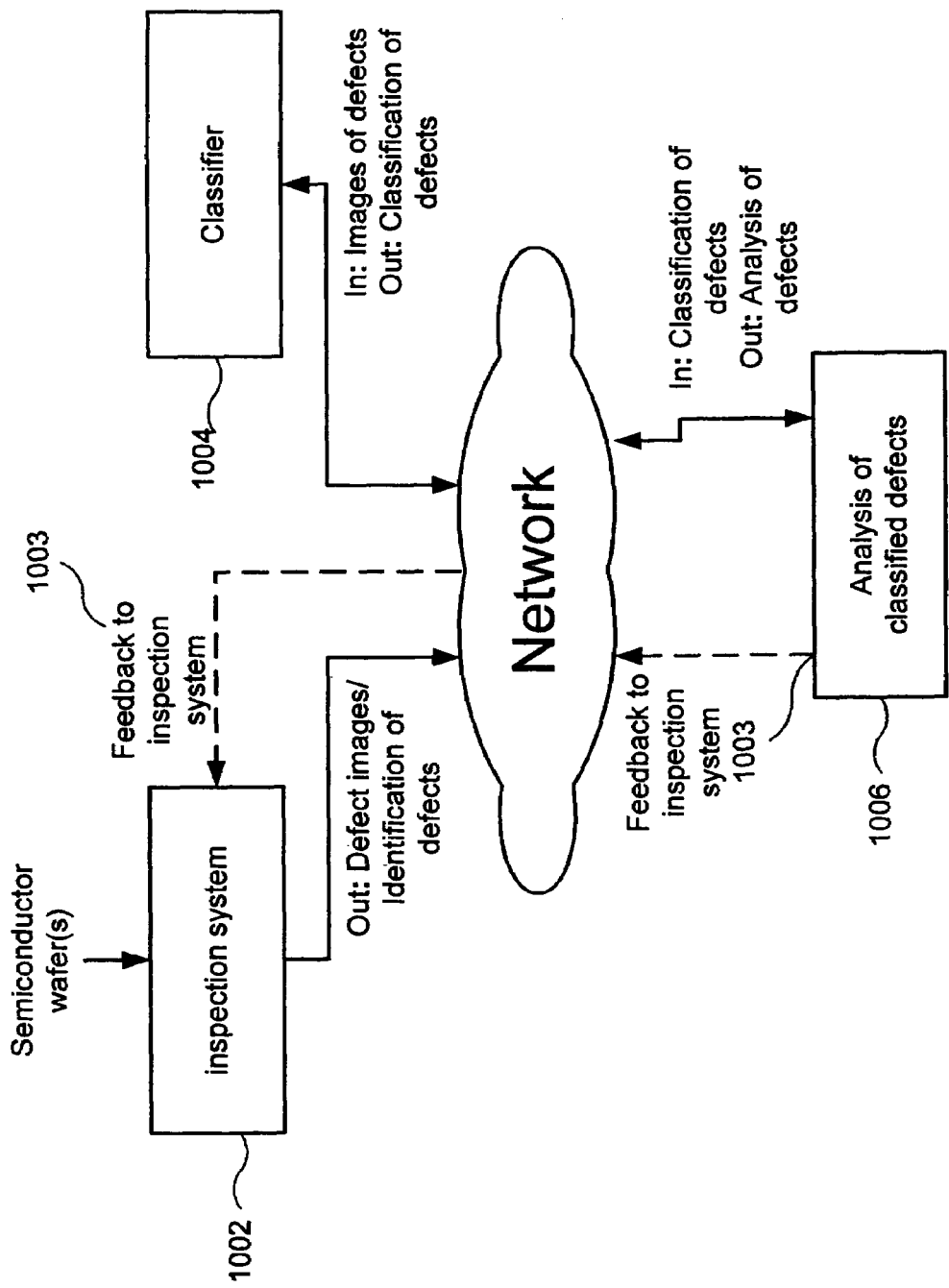
FIGS. 10(a), 10(b), and 10(c) are block diagrams of systems in accordance with the present invention distributed over a network, such as the internet or an intranet.
Figure 10B:
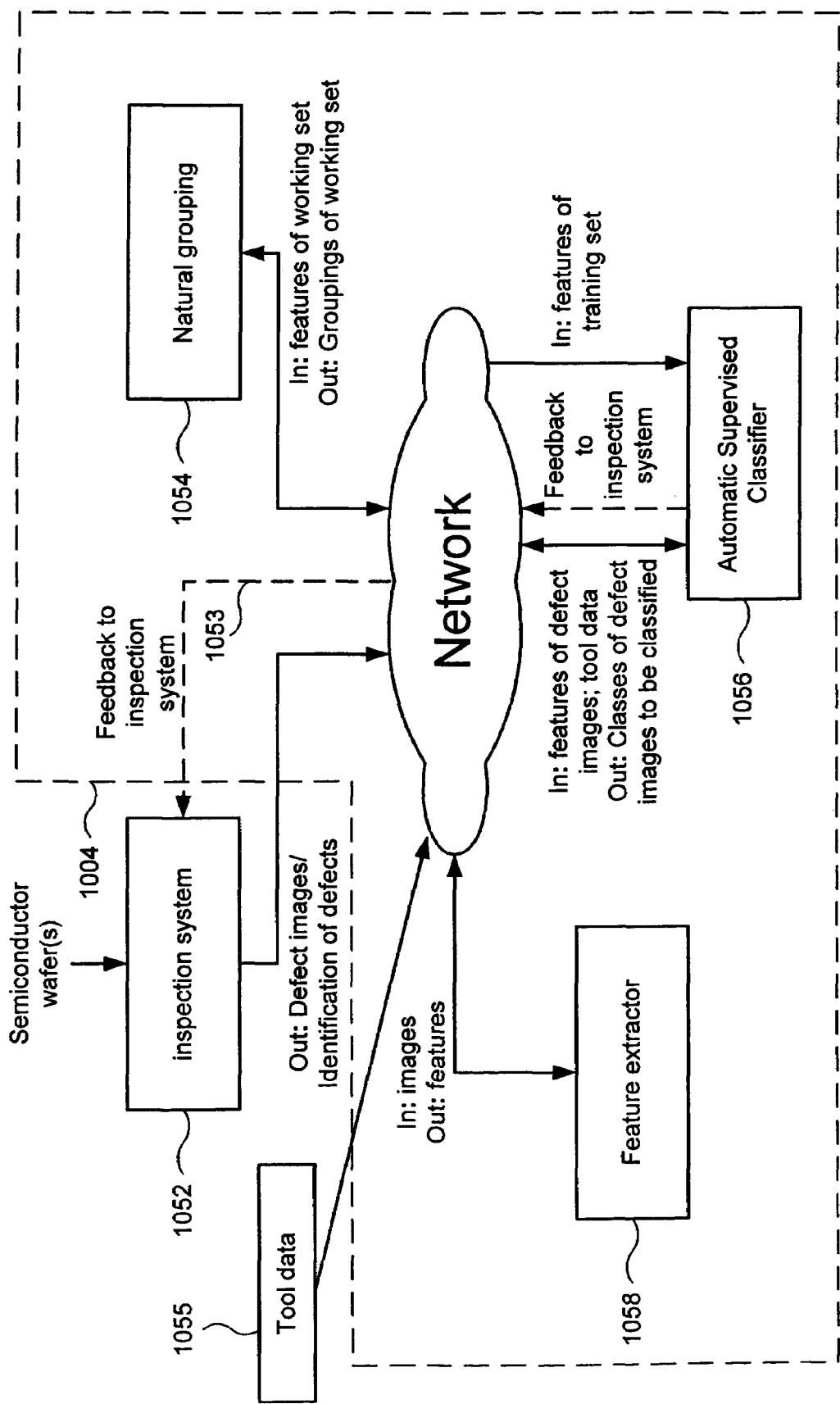
Figure 10C:
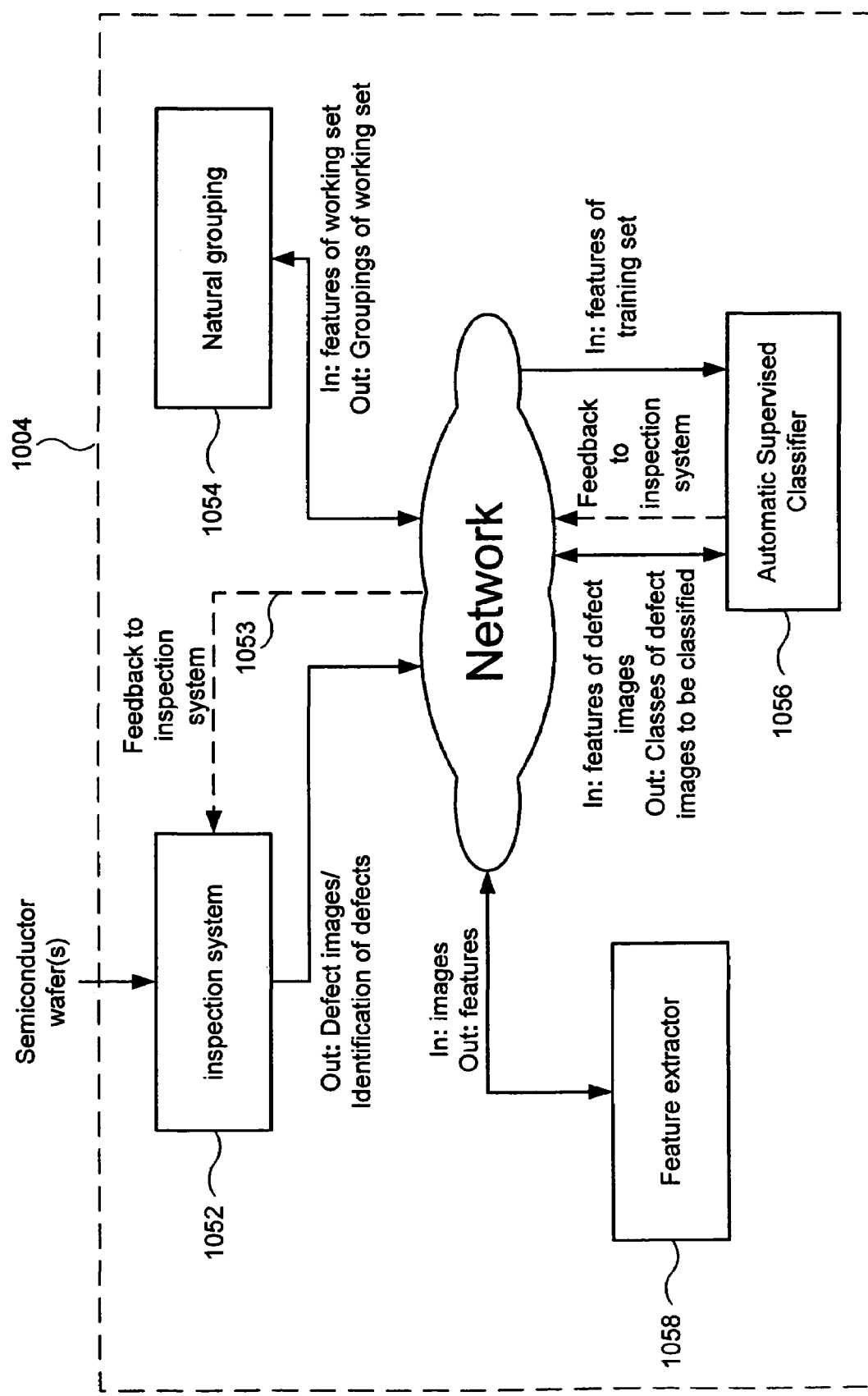

FIGS. 10(a) and 10(b) are block diagrams of systems in accordance with the present invention distributed over a network; such as the Internet or an intranet. In FIG. 10(a), an optical, ebeam, or other types of inspection systems 1002, a classifier 1004/104, and an analysis system 1006 (see FIG. 1) are distributed over the network. In FIG. 10(b), elements of classifier 1056/204, and a feature extractor 1058, are distributed over the network. Natural grouping process 1054 receives as inputs the features of the working set and outputs the natural grouping of the working set. Automatic supervised classifier 1056 receives the features and classes of the training set and the features of defect images, while outputting the classes of the defect images being classified. Feature extractor 1058 receives images and outputs features of the images.

FIG. 10(b) also shows an embodiment in which the classifier receives tool history 1005 as an input. Tool history includes, for example, the maintenance history of the tools or machine performing the inspection process and/or the manufacturing process. If the tool has been maintained according to its suggested maintenance schedule, its data may be weighted more than data from an unmaintained tool. Tool History 1055 may also include a threshold of inspection value, indicating that maintenance must be found in order for the classifier to give credence to the data from that tool. This threshold may vary for individual tools or may be the same for all the tools of a particular type or function. Tool history may also indicate, for example, whether two runs of semiconductors where taken from the same tool (or which tool they were taken from). Thus, tool history 1055 may include, for example, equipment Ids. If it is known, for example, that Tool A has had problems in the past, data from tool A may be treated differently than data from a trouble-free tool B.

As described above, FIG. 10(c) shows that the inspection and analysis/classification process is performed in real-time during the inspection process instead of as a separate process. In such a system, inspection system 1052 is shown inside the system 1004 to indicate that it is part of the same system as the classifier 1056. The system utilizes review images ("patch" images) to effect real-time inspection. New inspection systems such as the KLA 2350 include ADC embedded inside the image computer running in 'real time' during the inspection. This system, called an iADC (integrated ADC) system, works by grabbing 'patches' around the defect location during scan and performing ADC on the defective pixels in these patches. All this is done in hardware inside the inspector so that no addition throughput it required.

FIGS. 10(a), 10(b), and 10(c) each contain a dotted line 1003, 1053 depicting that, in certain systems, the classifier can provide feedback signals to the inspection system, in a similar manner discussed above in connection with FIG. 1.

It will be understood that various embodiments and alternations can exist without departing from the spirit and scope of the invention. For example, the concept of the invention can be extended to include automatically sorting images in the background (for example while running defect analysis software) by defect type, and then displaying the result as a wafer map with a distribution of each selected type shown over the wafer map. This is just one way of using the output data. Defect location distribution can be helpful in identifying defect source, so the ability to select similar defects (natural grouping) coupled with the ability to see their spatial distribution could be powerful. A display can be included showing for each cluster in the Kohonnen map a) a representative image, and b) a defect map showing the locations of the defects in the cluster.

From the above description, it will be apparent that the invention disclosed herein provides a novel and advantageous system and method of optical inspection used to classify semiconductor defects.

What is claimed is:

1. A method for classifying a plurality of images, comprising:
providing a working set of images;
prior to a user performing any classification of the working set of images, automatically sorting the working set of images into a plurality of groupings based on common features of the working set of images and displaying such groupings; and
after automatically sorting the working set of images into groupings, receiving input from the user to manually classify at least a subset of the working set of images facilitated by the displayed groupings.

2. The method of claim 1, wherein the groupings are initially displayed as a plurality of elements, wherein each element specifies a number that indicates how many of the working set of images are grouped together.

3. The method of claim 2, wherein each element is selectable by the user to thereby display the corresponding one or more working set of images that are grouped together.

4. The method of claim 1, further comprising:
providing a training set, wherein the training set is formed from the user's manually classified subset of the working set of images; and
automatically classifying the unclassified working set of images based on a plurality of features extracted from the training set and the working set of images and the user's manual classification of the training set.

5. The method of claim 4, further comprising displaying a visual representation of a comparison between the automatic classification and the manual classification performed by the user.

6. The method of claim 5, further comprising receiving input from the user to alter the training set based on the displayed visual representation of the comparison between the automatic classification and the manual classification performed by the user so that the automatic classification more closely matches the manual classification.

7. The method of claim 5, further comprising receiving input from the user to alter one or more parameters of the automatic classification based on the displayed visual representation of the comparison between the automatic classification and the manual classification performed by the user so that the automatic classification more closely matches the manual classification.

8. The method of claim 7, wherein altering the one or more parameters of the automatic classification includes graphically manipulating one or more images.

9. The method of claim 4, further comprising automatically classifying a second working set of images based on a plurality of features extracted from the training set and the second working set of images and the user selected classes of the training set.

10. The method of claim 4, wherein the common features used during the automatic sorting include one or more of a group consisting of size, brightness, color, shape, texture, moment of inertia, context, proximity to wafer features, proximity to other defects, connectivity to adjacent features, connectivity to other defects, and yield relevant properties derived from the corresponding image.

11. The method of claim 1, wherein the common features used during the automatic sorting include defect coordinates in wafers.

12. The method of claim 1, wherein the common features used during the automatic sorting include defect coordinates when spatial cluster analysis is used.

13. The method of claim 1, wherein common features used during the automatic sorting include information derived from one of the processing history, yield relevance, and origins of defects.

14. The method of claim 1, wherein automatically sorting the working set of images includes using a Kohonen map technique.

15. The method of claim 14, wherein the Kohonen map is seeded with non-random numbers.

16. The method of claim 14, wherein displaying the groupings includes arranging the working set of images to reflect the Kohonen map's layout.

17. The method of claim 14, wherein displaying the groupings includes arranging the working set of images into natural groupings or clusters.

18. The method of claim 1, wherein automatically sorting the working set of images includes using a K-means technique.

19. The method of claim 1, wherein automatically sorting the working set of images includes using a spatial signature analysis technique.

20. The method of claim 1, wherein automatically sorting the working set of images is based on a plurality of cluster features that each represent a cluster of the working set of images.

21. The method of claim 4, further comprising receiving input from the user or automatically receiving input for selecting a number of features to use for the automatic sorting and/or classification and applying such selected feature number to the automatic sorting and/or classification.

22. The method of claim 1, wherein the common features used during the automatic sorting include tool history information relating to an inspection system or tool history information relating to the past success rate of the classification step.

23. The method of claim 1, wherein the working set of images originate from a semiconductor inspection process.

24. A system for classifying a plurality of images, comprising:
a software portion configured to provide a working set of images;
a software portion configured to prior to a user performing any classification of the working set of images, automatically sort the working set of images into a plurality of groupings based on common features of the working set of images and displaying such groupings; and
a software portion configured to after automatically sorting the working set of images into groupings, receive input from the user to manually classify at least a subset of the working set of images facilitated by the displayed groupings.

25. The system of claim 24, wherein the groupings are initially displayed as a plurality of elements, wherein each element specifies a number that indicates how many of the working set of images are grouped together.

26. The system of claim 25, wherein each element is selectable by the user to thereby display the corresponding one or more working set of images that are grouped together.

27. The system of claim 24, a software portion configured to:
provide a training set, wherein the training set is formed from the user's manually classified subset of the working set of images; and
automatically classify the unclassified working set of images based on a plurality of features extracted from the training set and the working set of images and the user's manual classification of the training set.

28. The system of claim 27, a software portion configured to display a visual representation of a comparison between the automatic classification and the manual classification performed by the user.

29. The system of claim 28, a software portion configured to receive input from the user to alter the training set based on the displayed visual representation of the comparison between the automatic classification and the manual classification performed by the user so that the automatic classification more closely matches the manual classification.

30. The system of claim 28, a software portion configured to receive input from the user to alter one or more parameters of the automatic classification based on the displayed visual representation of the comparison between the automatic classification and the manual classification performed by the user so that the automatic classification more closely matches the manual classification.

31. The system of claim 30, wherein altering the one or more parameters of the automatic classification includes graphically manipulating one or more images.

32. The system of claim 27, a software portion configured to automatically classify a second working set of images based on a plurality of features extracted from the training set and the second working set of images and the user selected classes of the training set.

33. The system of claim 27, wherein the common features used during the automatic sorting include one or more of a group consisting of size, brightness, color, shape, texture, moment of inertia, context, proximity to wafer features, proximity to other defects, connectivity to adjacent features, connectivity to other defects, and yield relevant properties derived from the corresponding image.

34. The system of claim 24, wherein the common features used during the automatic sorting include defect coordinates in wafers.

35. The system of claim 24, wherein the common features used during the automatic sorting include defect coordinates when spatial cluster analysis is used.

36. The system of claim 24, wherein common features used during the automatic sorting include information derived from one of the processing history, yield relevance, and origins of defects.

37. The system of claim 24, wherein automatically sorting the working set of images includes using a Kohonen map technique.

38. The system of claim 37, wherein the Kohonen map is seeded with non-random numbers.

39. The system of claim 37, wherein displaying the groupings includes arranging the working set of images to reflect the Kohonen map's layout.

40. The system of claim 37, wherein displaying the groupings includes arranging the working set of images into natural groupings or clusters.

41. The system of claim 24, wherein automatically sorting the working set of images includes using a K-means technique.

42. The system of claim 24, wherein automatically sorting the working set of images includes using a spatial signature analysis technique.

43. The system of claim 24, wherein automatically sorting the working set of images is based on a plurality of cluster features that each represent a cluster of the working set of images.

44. The system of claim 27, a software portion configured to receive input from the user or automatically receiving input for selecting a number of features to use for the automatic sorting and/or classification and applying such selected feature number to the automatic sorting and/or classification.

45. The system of claim 24, wherein the common features used during the automatic sorting include tool history information relating to an inspection system or tool history information relating to the past success rate of the classification step.

46. The system of claim 24, wherein the working set of images originate from a semiconductor inspection process.

* * * * *

UNITED STATES PATENT AND TRADEMARK OFFICE
CERTIFICATE OF CORRECTION

PATENT NO. : 6,999,614 B1 Page 1 of 1
APPLICATION NO. : 09/724633
DATED : February 14, 2006
INVENTOR(S) : Bakker et al.

It is certified that error appears in the above-identified patent and that said Letters Patent is hereby corrected as shown below:

In the Title Page:

In page 2 (line 16) of the Title Page, under "Other Publications" section, change "Kamowski, Thomas P." to --Karnowski, Thomas P.--

Column 4, line 30, change "Selectron Method" to --Selection Method--.

Column 8, line 3, change "than improves" to --then improves--.

Column 8, line 40, add --classifier 1004, including a natural grouping process 1054, an automatic supervised-- after "of".

Column 8, line 43, change "grouping" to --groupings--.

Column 8, line 45, change "of defect" to --of the defect--.

Signed and Sealed this

Sixth Day of February, 2007

JON W. DUDAS
*Director of the United States Patent and Trademark Office*